(12) United States Patent
Gringhaus et al.

(10) Patent No.: US 11,199,326 B2
(45) Date of Patent: Dec. 14, 2021

(54) COMBUSTOR PANEL

(71) Applicant: UNITED TECHNOLOGIES CORPORATION, Farmington, CT (US)

(72) Inventors: Jason M. Gringhaus, Wethersfield, CT (US); James B. Hoke, Tolland, CT (US); Fumitaka Ichihashi, Unionville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 109 days.

(21) Appl. No.: 16/723,074

(22) Filed: Dec. 20, 2019

(65) Prior Publication Data
US 2021/0190317 A1 Jun. 24, 2021

(51) Int. Cl.
*F23R 3/00* (2006.01)
*F02C 7/18* (2006.01)
*F02C 7/24* (2006.01)
*F23R 3/06* (2006.01)

(52) U.S. Cl.
CPC ............. *F23R 3/002* (2013.01); *F02C 7/18* (2013.01); *F02C 7/24* (2013.01); *F23R 3/06* (2013.01); *F05D 2240/35* (2013.01); *F05D 2260/202* (2013.01); *F05D 2260/232* (2013.01); *F23R 2900/03041* (2013.01); *F23R 2900/03042* (2013.01)

(58) Field of Classification Search
CPC .... F23R 3/04; F23R 3/06; F23R 3/002; F23R 3/12; F23R 2900/03041; F23R 2900/03042; F05D 2260/202
See application file for complete search history.

(56) References Cited

U.S. PATENT DOCUMENTS 5,241,827 A * 9/1993 Lampes .................. F23R 3/002
60/754
6,145,319 A 11/2000 Burns et al.
6,408,629 B1 6/2002 Harris et al.
(Continued)

FOREIGN PATENT DOCUMENTS

EP 3633269 4/2020
WO 2013192540 12/2013
WO 2015126501 8/2015

OTHER PUBLICATIONS

European Patent Office, European Search Report dated Apr. 23, 2021 in Application No. 20215669.1.

*Primary Examiner* — Alain Chau
(74) *Attorney, Agent, or Firm* — Snell & Wilmer L.L.P.

(57) ABSTRACT

A liner assembly for use in a combustor of a gas turbine engine is disclosed. In various embodiments, the liner assembly includes a panel defining a left side and a right side and a hot side and a cold side, the panel having a dilution hole and a plurality of effusion holes extending between the hot side and the cold side. In various embodiments, the plurality of effusion holes includes a first subgrouping of effusion holes disposed downstream of the dilution hole and aligned in a generally left to right orientation toward a dividing line extending downstream of the dilution hole and a second subgrouping of effusion holes disposed downstream of the dilution hole and aligned in a generally right to left orientation toward the dividing line extending downstream of the dilution hole.

11 Claims, 7 Drawing Sheets

(56) References Cited

U.S. PATENT DOCUMENTS

| | | | |
|---|---|---|---|
| 6,513,331 B1* | 2/2003 | Brown | F23R 3/06 60/754 |
| 6,655,149 B2 | 12/2003 | Farmer et al. | |
| 6,708,499 B2* | 3/2004 | Pidcock | F23R 3/002 60/752 |
| 6,857,275 B2* | 2/2005 | Pidcock | F23R 3/002 60/752 |
| 7,000,397 B2* | 2/2006 | Pidcock | F23R 3/002 60/752 |
| 7,093,439 B2* | 8/2006 | Pacheco-Tougas | F23R 3/002 60/752 |
| 7,146,816 B2* | 12/2006 | Anderson | F23R 3/002 60/772 |
| 7,631,502 B2 | 12/2009 | Burd et al. | |
| 10,386,072 B2* | 8/2019 | Papple | F23R 3/06 |
| 2002/0124572 A1* | 9/2002 | Pidcock | F23R 3/002 60/796 |
| 2003/0213250 A1* | 11/2003 | Pacheco-Tougas | F23R 3/002 60/752 |
| 2004/0045298 A1* | 3/2004 | Pidcock | F23R 3/002 60/752 |
| 2004/0083739 A1* | 5/2004 | Pidcock | F23R 3/04 60/796 |
| 2005/0262846 A1* | 12/2005 | Pidcock | F23R 3/002 60/752 |
| 2016/0258623 A1* | 9/2016 | Tu | F23R 3/06 |
| 2017/0059162 A1* | 3/2017 | Papple | F23R 3/002 |
| 2018/0231252 A1* | 8/2018 | Clemen | F23R 3/002 |
| 2018/0266324 A1 | 9/2018 | Lao | |
| 2018/0283689 A1* | 10/2018 | Wang | F23R 3/06 |

* cited by examiner

COMBUSTOR PANEL

FIELD

The present disclosure relates to gas turbine engines and, more particularly, to heat shield panels used in the combustors of gas turbine engines.

BACKGROUND

Gas turbine engines, including those used to power modern commercial and military aircraft, typically include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and the fan sections. In a turbofan engine, a high pressure turbine stage typically drives a high pressure compressor stage and a low pressure turbine stage typically drives a low pressure compressor stage and a fan within the fan section.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more shells and one or more panels attached to the shells. Cooling cavities reside between the shells and the panels and fluidly couple impingement apertures extending through the shells with effusion apertures extending through the panels. Dilution holes are spaced circumferentially about the liner assemblies and serve to provide dilution air from a cooling plenum surrounding the combustor into the combustion chamber to improve emissions and to tailor the temperature profile of combustion gases at the combustor outlet to protect the turbine section from overheating.

SUMMARY

A liner assembly for use in a combustor of a gas turbine engine is disclosed. In various embodiments, the liner assembly includes a panel defining a left side and a right side and a hot side and a cold side, the panel having a dilution hole and a plurality of effusion holes extending between the hot side and the cold side. In various embodiments, the plurality of effusion holes includes a first subgrouping of effusion holes disposed downstream of the dilution hole and aligned in a generally left to right orientation toward a dividing line extending downstream of the dilution hole and a second subgrouping of effusion holes disposed downstream of the dilution hole and aligned in a generally right to left orientation toward the dividing line extending downstream of the dilution hole.

In various embodiments, the dividing line is oriented at a dividing line angle that is greater than zero degrees with respect to a reference line extending in a circumferential direction through the panel and through a center of the dilution hole. In various embodiments, the dividing line angle is within a range from ninety degrees to forty-five degrees. In various embodiments, the dividing line angle is within the range from eighty degrees to sixty degrees.

In various embodiments, each of the first subgrouping of effusion holes is oriented at a first axial angle from minus forty-five degrees to seventy-five degrees with respect to a reference line extending in a circumferential direction through the panel and through a center of the dilution hole. In various embodiments, each of the second subgrouping of effusion holes is oriented at a second axial angle from minus fifteen degrees to seventy-five degrees with respect to the reference line. In various embodiments, each of the first subgrouping of effusion holes is oriented at a first radial angle from fifteen degrees to seventy-five degrees with respect to the reference line. In various embodiments, each of the second subgrouping of effusion holes is oriented at a second radial angle from fifteen degrees to seventy-five degrees with respect to the reference line. In various embodiments, the first subgrouping of effusion holes is positioned within a distance downstream of the reference line equal to twice a diameter of the dilution hole. In various embodiments, the second subgrouping of effusion holes is positioned within the distance downstream of the reference line equal to twice the diameter of the dilution hole.

A combustor for a gas turbine engine is disclosed. In various embodiments, the combustor includes a shell and a panel configured for attachment to the shell, the panel defining a circumferential length and an axial length and a hot side and a cold side, the panel having a dilution hole and a plurality of effusion holes extending between the hot side and the cold side. In various embodiments, the plurality of effusion holes includes a first subgrouping of effusion holes disposed axially downstream of the dilution hole and aligned in a first circumferential orientation toward a dividing line extending axially downstream of the dilution hole and a second subgrouping of effusion holes disposed axially downstream of the dilution hole and aligned in a second circumferential orientation toward the dividing line extending downstream of the dilution hole.

In various embodiments, the dividing line is oriented at a dividing line angle within a range from ninety degrees to forty-five degrees with respect to a reference line extending in a circumferential direction through the panel and through a center of the dilution hole. In various embodiments, the dividing line angle is within the range from eighty degrees to sixty degrees with respect to the reference line. In various embodiments, each of the first subgrouping of effusion holes is oriented at a first axial angle from minus forty-five degrees to seventy-five degrees with respect to the reference line. In various embodiments, each of the second subgrouping of effusion holes is oriented at a second axial angle from minus fifteen degrees to seventy-five degrees with respect to the reference line. In various embodiments, each of the first subgrouping of effusion holes is oriented at a first radial angle from fifteen degrees to seventy-five degrees with respect to the reference line and each of the second subgrouping of effusion holes is oriented at a second radial angle from fifteen degrees to seventy-five degrees with respect to the reference line.

A method of cooling a hot side of a panel within a combustor is disclosed. In various embodiments, the method includes providing a compressed air to a plenum adjacent a cold side of the panel, the panel having a dilution hole and a plurality of effusion holes extending between the hot side and the cold side; and directing the compressed air through the plurality of effusion holes to establish a cooling film on the hot side of the panel, the plurality of effusion holes including a first subgrouping of effusion holes disposed downstream of the dilution hole and aligned in a generally left to right orientation toward a dividing line extending downstream of the dilution hole and a second subgrouping of effusion holes disposed downstream of the dilution hole and aligned in a generally right to left orientation toward the dividing line extending downstream of the dilution hole.

In various embodiments, the dividing line is oriented at a dividing line angle within a range from eighty degrees to sixty degrees with respect to a reference line extending in a circumferential direction through the panel and through a center of the dilution hole, each of the first subgrouping of effusion holes is oriented at a first axial angle from minus forty-five degrees to seventy-five degrees with respect to the reference line and each of the second subgrouping of effusion holes is oriented at a second axial angle from minus fifteen degrees to seventy-five degrees with respect to the reference line.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
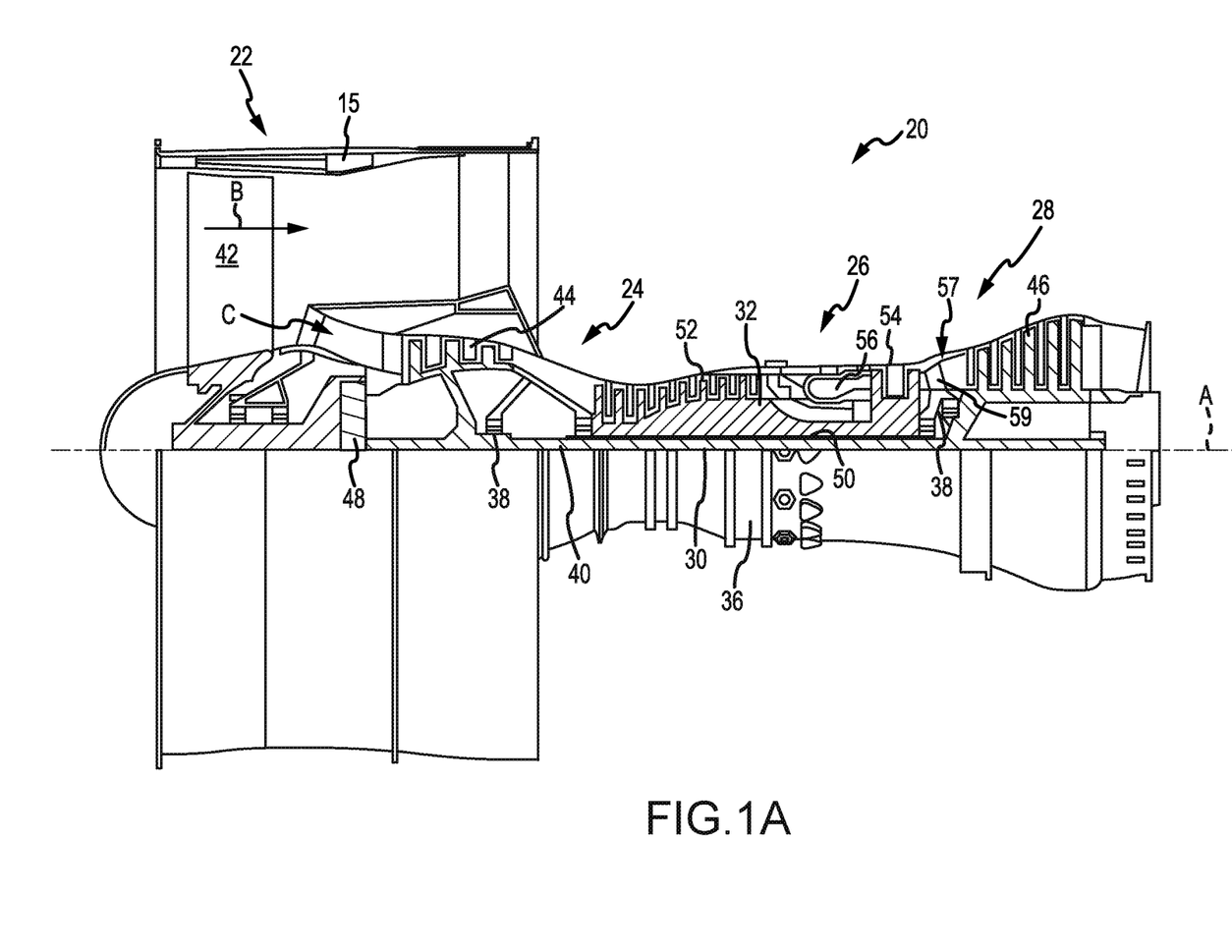
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including, for example, architectures having three or more spools or only a single spool.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which, in this gas turbine engine 20, is illustrated as a fan drive gear system 48 configured to drive the fan 42 at a lower speed than that of the low speed spool 30. The high speed spool 32 generally includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
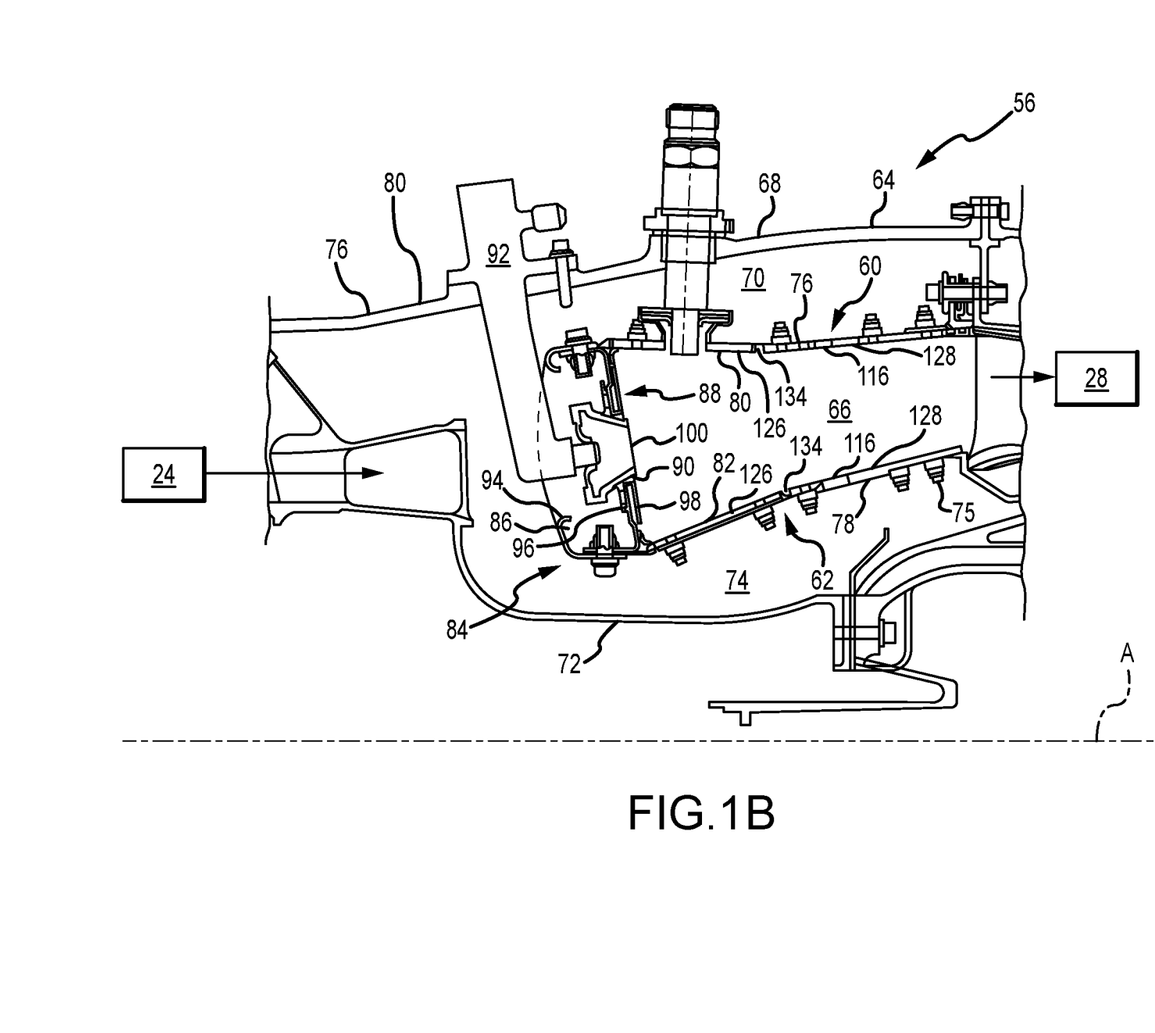
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that this disclosure is also applicable to other combustor types having various combustor liner arrangements.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material. The panels are typically arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed air from the compressor section 24 located upstream of the combustor 56. The forward assembly 84 generally includes an annular hood 86, the bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and the swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces compressed air from the core flow path C into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes that introduce cooling air from the outer annular plenum 70 into a space between the outer support shell 76 and a cold side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cold side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
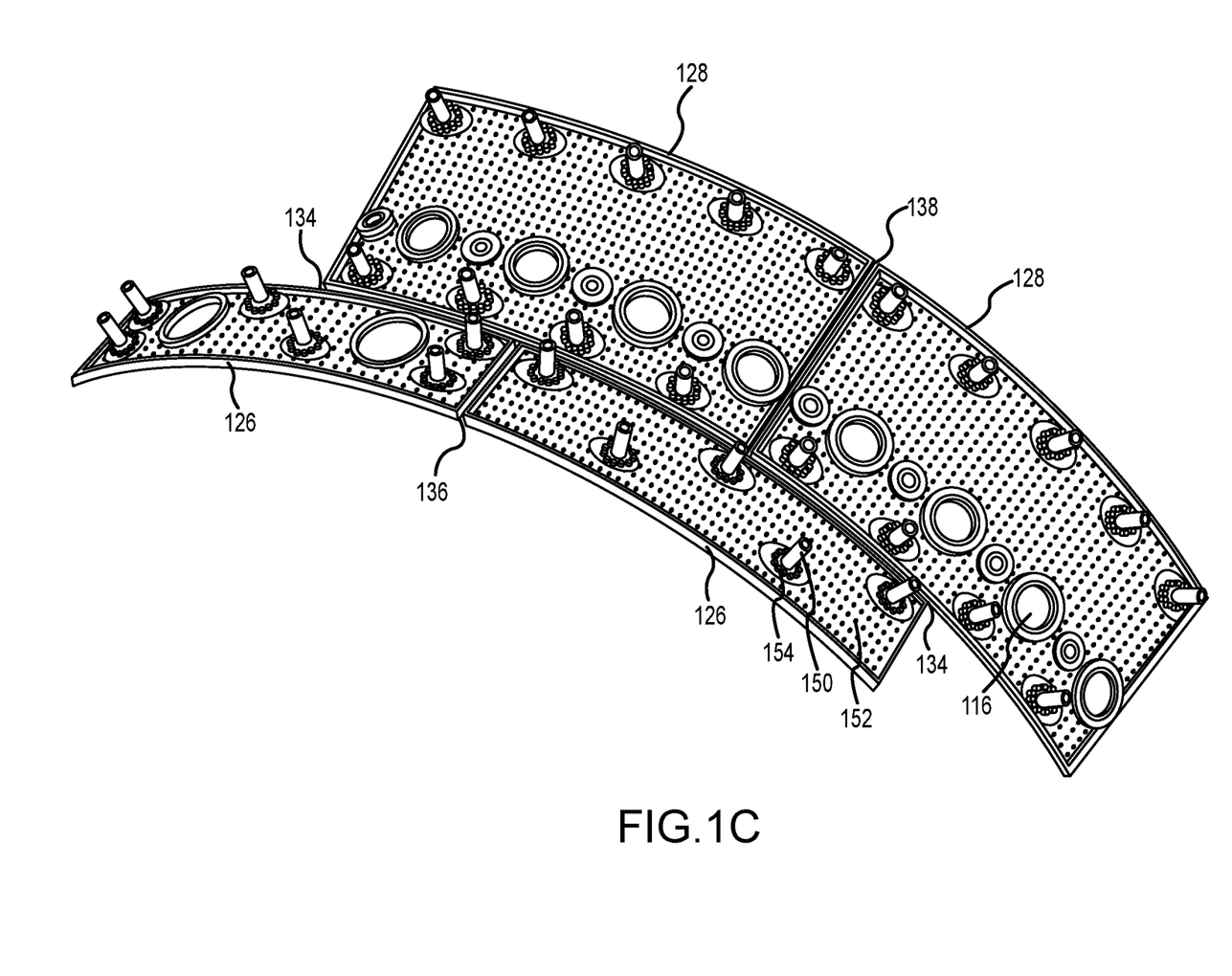
FIG. 1C is a perspective schematic view of a heat shield panel arrangement of a combustor, viewing from the cold side, in accordance with various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is a plurality of orifices 116, that may include dilution holes or air feed holes of various dimension, a plurality of effusion holes 152 and a shield attachment mechanism, which includes a stud 150 and a plurality of spacer pins 154.

Figure 2:
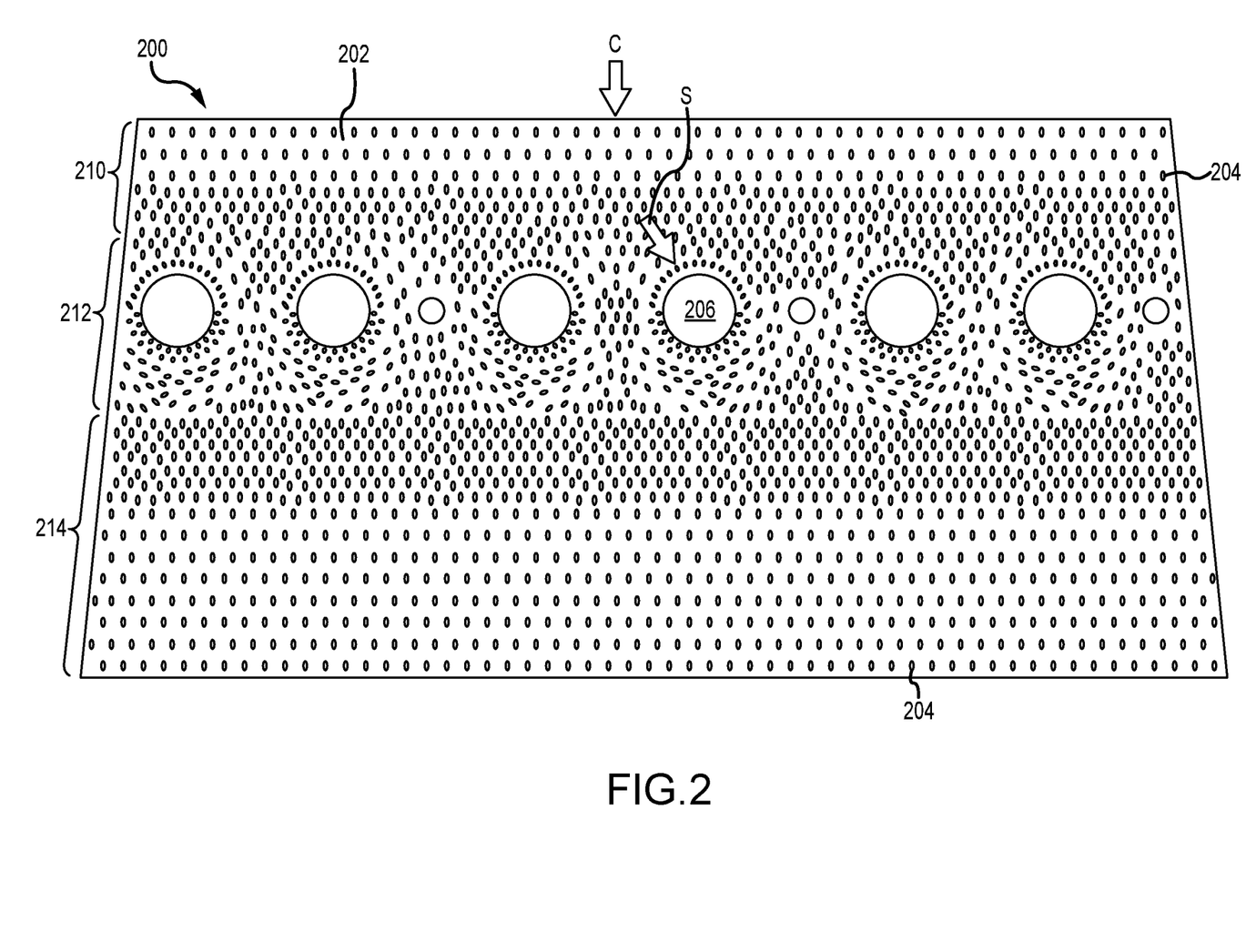
FIG. 2 is a schematic view of a hot side of a combustor liner, in accordance with various embodiments.

Referring now to FIG. 2, a panel 200 is illustrated, viewing toward a hot side 202, in accordance with various embodiments. The panel 200 is similar to the panels described above, including the outer panels 80 and the inner panels 82. The panel 200 defines a circumferential length and an axial length and includes a plurality of effusion holes 204 configured to provide a film of cooling air over the hot side 202 during operation of a combustor, such as, for example, the combustor 56 described above with reference to FIGS. 1A-1C. The panel 200 also includes a plurality of dilution holes 206 that are configured to provide a stream of dilution air from a plenum positioned proximate the cold side of the panel 200. The plenum, for example, may comprise, one of the outer annular plenum 70 or the inner annular plenum 74 described above with reference to FIGS. 1A-1C.

Still referring to FIG. 2, various groupings of the plurality of effusion holes 204 are illustrated. Broadly, a first grouping 210 of the plurality of effusion holes 204 is disposed upstream of the plurality of dilution holes 206, a second grouping 212 of the plurality of effusion holes 204 is disposed proximate and immediately downstream of the plurality of dilution holes 206, and a third grouping 214 of the plurality of effusion holes 204 is disposed downstream of the second grouping 212. Each of the plurality of effusion holes 204 in the first grouping 210 extends through the panel 200 in a direction substantially aligned with the bulk flow direction of the core flow path C and is typically slanted in the downstream or axial direction such that the cooling air exiting each effusion hole smoothly transitions onto the hot side 202 of the panel 200 to form a stable film of cooling fluid. As illustrated, the third grouping 214 of the plurality of effusion holes 204 shares similar directional characteristics to the first grouping 210, with both the first grouping 210 and the third grouping 214 exhibiting higher densities of effusion holes in the vicinity of the second grouping 212 than in the regions, respectively, farther upstream or farther downstream of the second grouping 212. As will be described further below, various ones of the plurality of effusion holes 204 in the second grouping 212 are oriented at substantial angles with respect to the bulk flow direction of the core flow path C. The substantial angles (or the non-alignment of the effusion holes with the bulk flow direction) are configured to provide enhanced cooling of localized regions of increased heating downstream of the plurality of dilution holes 206. In various embodiments, the localized regions of increased heating result from a complicated fluid mechanical interaction of the bulk flow and the flow through each of the plurality of dilution holes 206, which is generally perpendicular to the bulk flow. Further complicating the interaction is a swirl component S of the bulk flow near the surface or hot side 202 of the panel 200, the result being complex vortical structures of the flow field immediately downstream of each of the plurality of dilution holes 206 that tend to disrupt or render unstable the otherwise smooth transition of cooling fluid onto the hot side 202 of the panel 200.

Figure 3A:
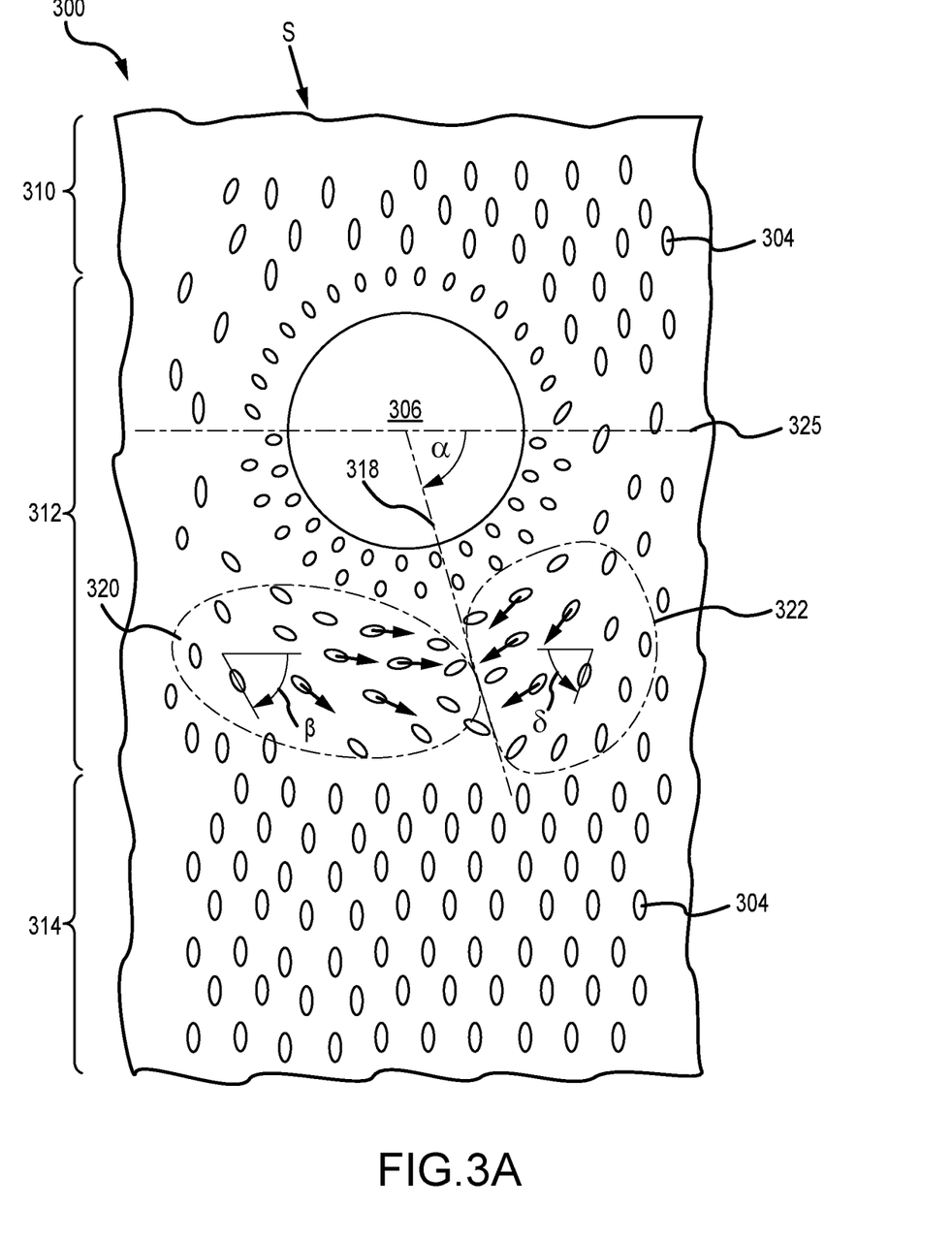
FIGS. 3A and 3B are schematic views of a hot side of a combustor liner in the vicinity of a dilution hole, in accordance with various embodiments.
Figure 3B:
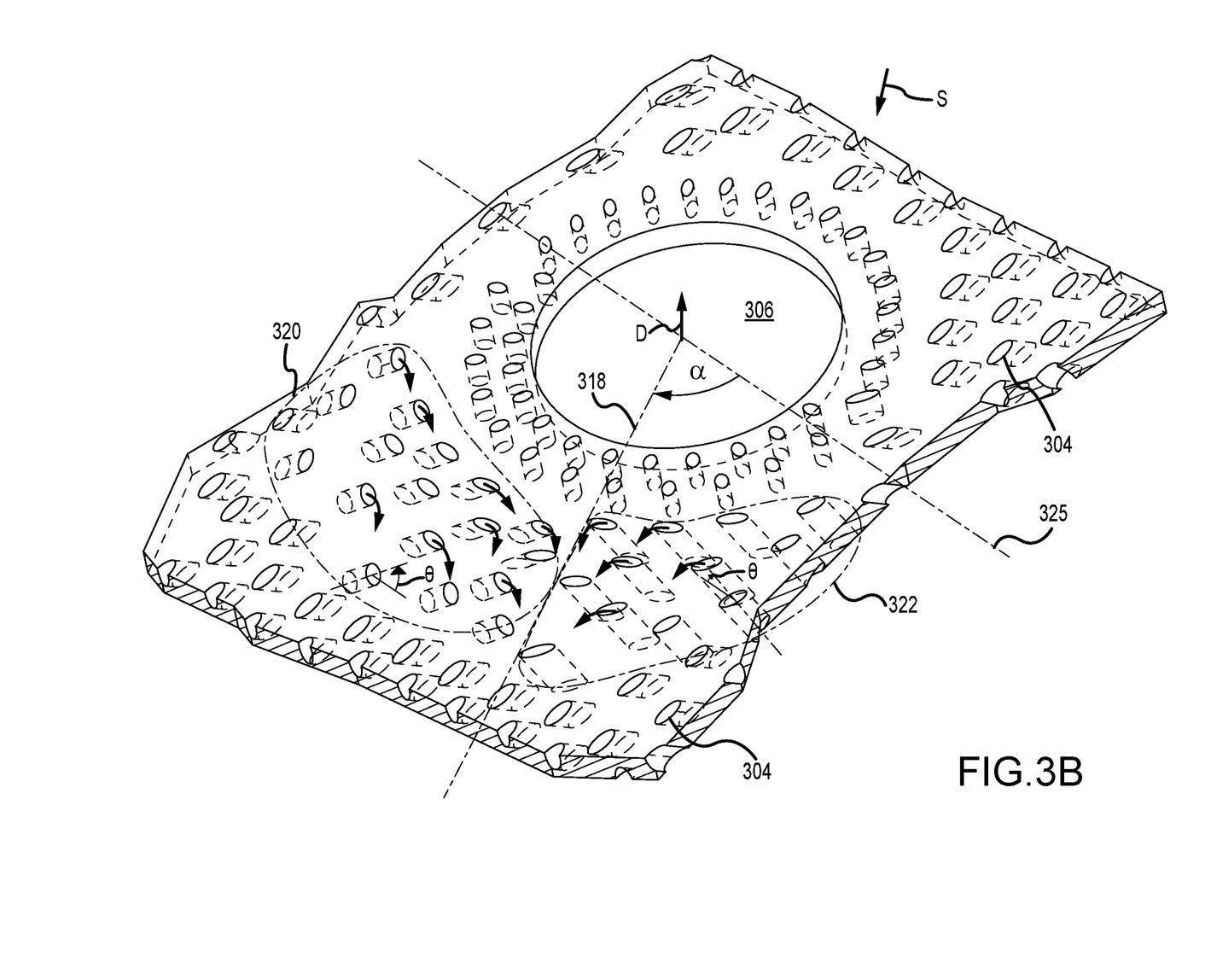

Referring now to FIGS. 3A and 3B, a segment of a panel 300, similar to the panel 200 described above with reference to FIG. 2, is illustrated. The panel 300 includes a dilution hole 306 that is surrounded by a plurality of effusion holes 304. Similar to the groupings of effusion holes discussed above with reference to FIG. 2, a first grouping 310 of the plurality of effusion holes 304 is disposed upstream of the dilution hole 306, a second grouping 312 of the plurality of effusion holes 304 is disposed proximate and immediately downstream of the dilution hole 306, and a third grouping 314 of the plurality of effusion holes 304 is disposed downstream of the second grouping 312. Focusing on the second grouping 312, a first subgrouping 320 of the plurality of effusion holes 304 (or a first subgrouping of effusion holes) is illustrated positioned to the left of a dividing line 318 and a second subgrouping 322 of the plurality of effusion holes 304 (or a second subgrouping of effusion holes) is disposed to the right of the dividing line 318. In various embodiments, each of the plurality of effusion holes 304 within the first subgrouping 320 is aligned in a generally left to right orientation, such that the flow of cooling fluid exiting the effusion holes does so in a generally left to right direction toward the dividing line 318. Similarly, each of the plurality of effusion holes 304 within the second subgrouping 322 is aligned in a generally right to left orientation, such that the flow of cooling fluid exiting the effusion holes does so in a generally right to left direction toward the dividing line 318.

The dividing line 318, which is an imaginary demarcation between the first subgrouping 320 and the second subgrouping 322, is oriented at an angle $\alpha$ (or a dividing line angle) with respect to a reference line 325 (typically exhibiting slight curvature along a circumferential surface of the panel 300) that extends in a circumferential direction about the panel 300 and through a center of the dilution hole. In various embodiments, the angle $\alpha$ is selected to follow the local flow direction downstream of the dilution hole 306, where the local flow direction will be a function of the mass, momentum and energy of the interacting bulk flow, which typically has a swirl component S, and the flow D through the dilution hole. For example, if a pair of counter-rotating vortices are formed downstream of the dilution hole 306 due to interaction between the bulk flow (having swirl component S) and the flow D through the dilution hole 306, the flow of cooling fluid from each of the effusion holes comprising the first subgrouping 320 and the second subgrouping 322 may be directed toward the dividing line 318 to provide a more stable cooling film in the space existing between the counter-rotating vortices. In various embodiments, the angle $\alpha$ will range from about ninety degrees (90°) to about forty-five degrees (45°), with ninety degrees extending in the axial direction of the combustor. In various embodiments, the angle $\alpha$ will range from about ninety degrees (90°) where the swirl component S is small with respect to the flow D through the dilution hole 306 to about forty-five degrees (45°) where the swirl component S is large with respect to the flow D through the dilution hole 306. In various embodiments, the angle $\alpha$ will range from about eighty degrees (80°) to about sixty degrees (60°). In various embodiments, the effusion holes within the first subgrouping 320 and the second subgrouping 322 are disposed through the panel 300 within a distance on the order of between one-half and three diameters of the dilution hole 306 downstream of the reference line 325 or, in various embodiments, within a distance on the order of between one-half and two diameters downstream of the reference line 325. In various embodiments, the effusion holes within one or both of the first subgrouping 320 and the second subgrouping 322 are disposed through the panel 300 within a distance downstream of the reference line 325 equal to twice the diameter of the dilution hole 306.

In various embodiments, the phrase "generally left to right orientation" (or a first circumferential orientation) of the first subgrouping 320 of effusion holes contemplates an angle $\beta$ (a first axial angle) within a range of minus forty-five degrees (−45°) to seventy-five degrees (75°), where the angle $\beta$ is in the axial direction with respect to the reference line 325 (or to a line parallel to the reference line 325) that extends in a circumferential direction about the panel 300 and negative $\beta$ refers to an orientation directed upstream with respect to the bulk flow. Similarly, in various embodiments, the phrase "generally right to left orientation" (or a second circumferential orientation) of the second subgrouping 322 of effusion holes contemplates an angle δ (a second axial angle) within a range of minus fifteen degrees (−15°) to seventy-five degrees (75°), where the angle δ is in the axial direction with respect to the reference line 325 (or to a line parallel to the reference line 325) and negative δ refers to an orientation directed upstream with respect to the bulk flow. Also, in various embodiments, each of the effusion holes within the first subgrouping 320 and the second subgrouping 322 are also oriented at an angle θ (a first radial angle and a second radial angle, respectively) within a range of fifteen degrees (15°) to seventy-five degrees (75°) in a radial direction with respect to the reference line 325 (with an angle θ of ninety degrees (90°) being in a substantially radial direction). Note, as illustrated in FIGS. 3A and 3B, that each of the effusion holes within the first subgrouping 320 and the second subgrouping 322 may exhibit various orientations within the identified ranges; stated otherwise, not all the effusion holes within the first subgrouping 320 share the same orientation and not all the effusion holes within the second subgrouping 322 share the same orientation.

Figure 4:
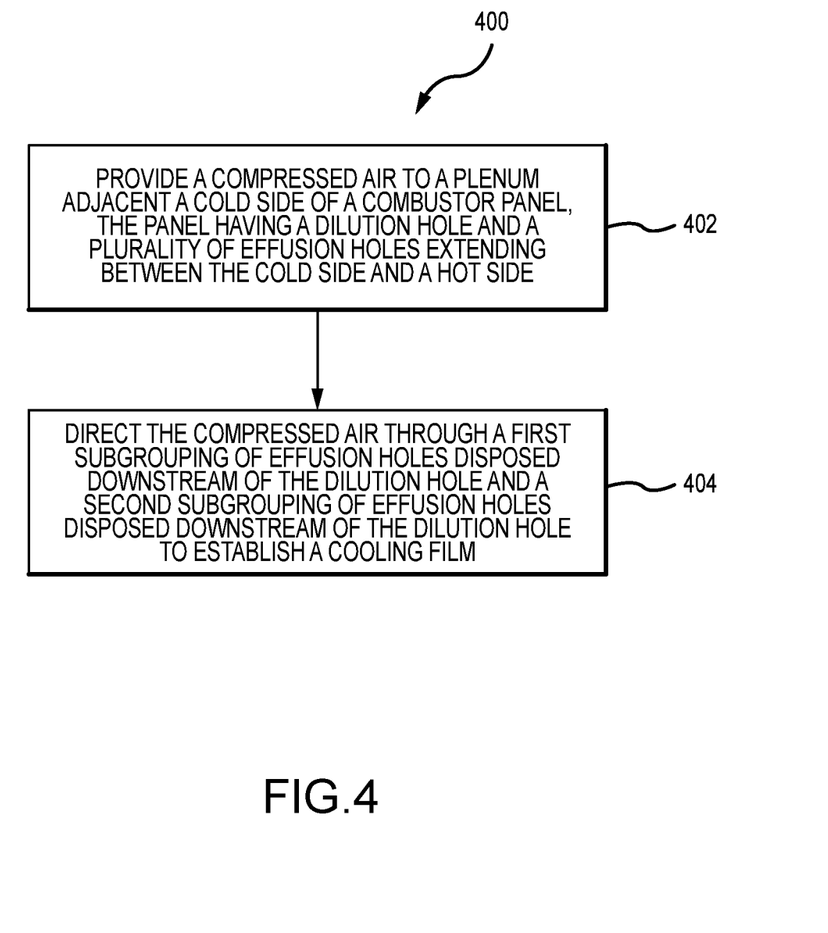
FIG. 4 describes a method of cooling a hot side of a panel within a combustor, in accordance with various embodiments.

Referring now to FIG. 4, a method 400 of cooling a hot side of a panel within a combustor is described as including the following steps. A first step 402 includes providing a compressed air to a plenum adjacent a cold side of the panel, the panel having a dilution hole and a plurality of effusion holes extending between the cold side and a hot side. A second step 404 includes directing the compressed air through the plurality of effusion holes to establish a cooling film on the hot side of the panel, the plurality of effusion holes including (i) a first subgrouping of effusion holes disposed downstream of the dilution hole and aligned in a generally left to right orientation toward a dividing line extending downstream of the dilution hole and (ii) a second subgrouping of effusion holes disposed downstream of the dilution hole and aligned in a generally right to left orientation toward the dividing line extending downstream of the dilution hole. In various embodiments, the dividing line is oriented at a dividing line angle within a range from eighty degrees to sixty degrees with respect to a reference line extending in a circumferential direction through the panel and through a center of the dilution hole, each of the first subgrouping of effusion holes is oriented at a first axial angle from minus forty-five degrees to seventy-five degrees with respect to the reference line and each of the second subgrouping of effusion holes is oriented at a second axial angle from minus fifteen degrees to seventy-five degrees with respect to the reference line.

The foregoing disclosure provides a cooling system for a combustor panel in regions aft of the dilution holes. The local flow structure and the three-dimensional geometry of the panel in these regions are complex and, as such, render efficient cooling of these regions via effusion difficult. The apparatus and methods described herein aim to maximize both the effusion cooling flux and the film effectiveness by wrapping the effusion holes around the aft region downstream of the dilution holes, such that the effusion holes are oriented in two circumferential directions, both left-to-right and right-to-left, to follow the flow field from either side of the dilution hole. The apparatus and methods maximize the density of effusion cooling holes in the region aft of dilution holes, which increases the effusion flux capability in this location. This also maximizes the film cooling effectiveness by following the fluid flow field as it wraps around the fluid jets as they penetrate the core gas-path through the dilution holes. When the effusion hole flow field is aligned in a direction of the local flow field, one result is a more effective cooling film structure, rather than the film or film structure being blown away by a stronger opposing flow vector. Benefits of the apparatus and methods disclosed herein include a reduction in panel temperature and, thereby, a concurrent increase in the overall durability of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A liner assembly for use in a combustor of a gas turbine engine, comprising:
a panel defining a hot side and a cold side, the panel having a dilution hole and a plurality of effusion holes extending between the hot side and the cold side, the panel extending from a forward end to an aft end in an axial direction and from a left side to a right side in a circumferential direction with respect to an engine central longitudinal axis;
wherein the plurality of effusion holes includes
a first subgrouping of effusion holes disposed downstream aft of the dilution hole and aligned in a generally left to right orientation toward a dividing line extending aft from a center of the dilution hole and
a second subgrouping of effusion holes disposed downstream aft of the dilution hole and aligned in a generally right to left orientation toward the dividing line extending aft from the center of the dilution hole,
wherein the first subgrouping of effusion holes is positioned within a distance between one-half and two diameters of the dilution hole aft of a reference line extending in a circumferential direction through the panel and through the center of the dilution hole,
wherein the second subgrouping of effusion holes is positioned within the distance between one-half and two diameters of the dilution hole aft of the reference line;
wherein the dividing line is oriented at a dividing line angle with respect to the reference line extending in the circumferential direction through the panel and through the center of the dilution hole, and the dividing line angle is within the range from eighty degrees to sixty degrees.

2. The liner assembly of claim 1, wherein each of the first subgrouping of effusion holes is oriented at a first axial angle from minus forty-five degrees to seventy-five degrees with respect to a reference line extending in a circumferential direction through the panel and through a center of the dilution hole.

3. The liner assembly of claim 2, wherein each of the second subgrouping of effusion holes is oriented at a second axial angle from minus fifteen degrees to seventy-five degrees with respect to the reference line.

4. The liner assembly of claim 3, wherein each of the first subgrouping of effusion holes is oriented at a first radial angle from fifteen degrees to seventy-five degrees with respect to the reference line.

5. The liner assembly of claim 4, wherein each of the second subgrouping of effusion holes is oriented at a second radial angle from fifteen degrees to seventy-five degrees with respect to the reference line.

6. A combustor for a gas turbine engine, comprising:
a shell; and
a panel configured for attachment to the shell, the panel extending from a forward end to an aft end in an axial direction and from a left side to a right side in a circumferential direction with respect to an engine central longitudinal axis, the panel defining a circumferential length and an axial length and a hot side and a cold side, the panel having a dilution hole and a plurality of effusion holes extending between the hot side and the cold side, the plurality of effusion holes including
a first subgrouping of effusion holes disposed aft of the dilution hole and aligned in a first circumferential orientation toward a dividing line extending aft from a center of the dilution hole and
a second subgrouping of effusion holes disposed aft of the dilution hole and aligned in a second circumferential orientation toward the dividing line extending aft from the center of the dilution hole,
wherein the first subgrouping of effusion holes is positioned within a distance between one-half and two diameters of the dilution hole aft of a reference line extending in a circumferential direction through the panel and through the center of the dilution hole and
wherein the second subgrouping of effusion holes is positioned within the distance between one-half and two diameters of the dilution hole aft of the reference line; and
wherein the dividing line is oriented at a dividing line angle with respect to the reference line extending in the circumferential direction through the panel and through the center of the dilution hole, and the dividing line angle is within the range from eighty degrees to sixty degrees.

7. The combustor of claim 6, wherein each of the first subgrouping of effusion holes is oriented at a first axial angle from minus forty-five degrees to seventy-five degrees with respect to the reference line.

8. The combustor of claim 7, wherein each of the second subgrouping of effusion holes is oriented at a second axial angle from minus fifteen degrees to seventy-five degrees with respect to the reference line.

9. The combustor of claim 8, wherein each of the first subgrouping of effusion holes is oriented at a first radial angle from fifteen degrees to seventy-five degrees with respect to the reference line and each of the second subgrouping of effusion holes is oriented at a second radial angle from fifteen degrees to seventy-five degrees with respect to the reference line.

10. A method of cooling a hot side of a panel within a combustor, comprising:
providing a compressed air to a plenum adjacent a cold side of the panel, the panel extending from a forward end to an aft end in an axial direction and from a left side to a right side in a circumferential direction with respect to an engine central longitudinal axis, the panel having a dilution hole and a plurality of effusion holes extending between the hot side and the cold side; and
directing the compressed air through the plurality of effusion holes to establish a cooling film on the hot side of the panel, the plurality of effusion holes including
a first subgrouping of effusion holes disposed aft of the dilution hole and aligned in a generally left to right orientation toward a dividing line extending aft from a center of the dilution hole, and
a second subgrouping of effusion holes disposed aft of the dilution hole and aligned in a generally right to left orientation toward the dividing line extending aft from the center of the dilution hole,
wherein the first subgrouping of effusion holes is positioned within a distance between one-half and two diameters of the dilution hole aft of a reference line extending in a circumferential direction through the panel and through the center of the dilution hole, wherein the second subgrouping of effusion holes is positioned within the distance between one-half and two diameters of the dilution hole aft of the reference line; and wherein the dividing line is oriented at a dividing line angle within a range from eighty degrees to sixty degrees with respect to the reference line extending in the circumferential direction through the panel and through the center of the dilution hole.

11. The method of claim 10, wherein each of the first subgrouping of effusion holes is oriented at a first axial angle from minus forty-five degrees to seventy-five degrees with respect to the reference line and each of the second subgrouping of effusion holes is oriented at a second axial angle from minus fifteen degrees to seventy-five degrees with respect to the reference line.

\* \* \* \* \*